US009022478B2

(12) United States Patent
Golarz

(10) Patent No.: US 9,022,478 B2
(45) Date of Patent: May 5, 2015

(54) STICK-SLIP ELIMINATION DEVICE FOR SEAT RECLINER MECHANISM

(71) Applicant: Lear Corporation, Southfield, MI (US)

(72) Inventor: B. Paul Golarz, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 142 days.

(21) Appl. No.: 13/894,615

(22) Filed: May 15, 2013

(65) Prior Publication Data

US 2014/0001806 A1 Jan. 2, 2014

Related U.S. Application Data

(60) Provisional application No. 61/667,018, filed on Jul. 2, 2012.

(51) Int. Cl.
*B60N 2/02* (2006.01)
*B60N 2/225* (2006.01)

(52) U.S. Cl.
CPC .............. *B60N 2/225* (2013.01); *B60N 2/2252* (2013.01); *B60N 2/2254* (2013.01)

(58) Field of Classification Search
CPC ............................ B60N 2/2254; B60N 2/2252
USPC ......................... 297/362, 362.12, 366, 367 R
See application file for complete search history.

(56) References Cited

U.S. PATENT DOCUMENTS

| | | | | |
|---|---|---|---|---|
| 7,314,250 | B1 * | 1/2008 | Eblenkamp et al. | 297/362 |
| 7,455,361 | B2 * | 11/2008 | Stemmer et al. | 297/362 |
| 7,520,568 | B2 | 4/2009 | Hoshihara et al. | |
| 7,878,593 | B2 * | 2/2011 | Nae | 297/362 |
| 8,128,169 | B2 * | 3/2012 | Narita et al. | 297/362 |
| 2012/0007402 | A1 * | 1/2012 | Stilleke et al. | 297/362 |

* cited by examiner

*Primary Examiner* — Laurie Cranmer
(74) *Attorney, Agent, or Firm* — Brooks Kushman P.C.

(57) ABSTRACT

A recliner mechanism including an anti-back drive device for releasably securing a seat back with respect to a seat cushion is provided. The mechanism may include an upper gear plate affixed to the seat back and a lower gear plate secured to a seat bottom. Wedges may be mounted in relation to the upper gear plate. A clutch spring may be located within the lower gear plate and a split bushing may be disposed between the clutch spring and the lower gear plate. A split leaf bushing may be disposed between the wedges and the clutch spring. A wedge spring may engage the wedges biasing them against the split leaf bushing. Upon rotation of a driver, the clutch spring and the one or more wedges are arcuately displaced and lock the seat back in position.

19 Claims, 5 Drawing Sheets

10 14 20 18 22 16 18 22 24 16 12

STICK-SLIP ELIMINATION DEVICE FOR SEAT RECLINER MECHANISM

CROSS-REFERENCE TO RELATED APPLICATIONS

This application claims the benefit of U.S. Provisional Application No. 61/667,018 filed Jul. 2, 2012, the disclosure of which is incorporated in its entirety by reference herein.

TECHNICAL FIELD

The present application is directed to a seat recliner mechanism and, more particularly, a seat recliner mechanism including a device for eliminating a stick-slip condition.

BACKGROUND

Automobile seats usually have a seat cushion and a seat back. To allow the seat back to be positioned at a desired angular orientation relative to the seat cushion, reclining mechanisms are often provided. Those mechanisms permit the seat back to be pivoted as desired by the seat occupant between a relatively upright position, through intermediate positions, to a substantially reclined position that allows the seat occupant to be recumbent.

SUMMARY

The present invention relates to a recliner mechanism including an anti-back drive device for releasably securing a seat back with respect to a seat cushion. It includes an upper gear plate that is affixed to the seat back. The upper gear plate defines gear teeth. A lower gear plate is secured to a seat bottom and defines gear teeth that cooperate with the gear teeth of the upper gear plate. The upper gear plate may rotate about an axis of rotation that is displaced from an axis associated with the lower gear plate so that the upper gear plate may rotate eccentrically in relation to the lower gear plate.

At least one wedge is mounted in relation to the upper gear plate. A clutch spring is located within a central bore of the lower gear plate. Further, a split bushing is disposed within the central bore between the lower gear plate and the clutch spring so that an outside surface of the clutch spring may frictionally engage the first bushing. A wedge spring may engages the at least one wedge and bias the at least one wedge arcuately and outwardly so that at least one wedge may engage an inner surface of the clutch spring.

The mechanism may include a split leaf bushing disposed between the at least one wedge and the clutch spring so that the at least one wedge engages the clutch spring through contact with the split leaf bushing.

A driver may extend between the lower gear plate, the clutch spring, the wedge spring, and the upper gear plate. Upon rotation of the driver, the clutch spring and the one or more wedges may be arcuately displaced so that the displacement of the upper gear plate is less than the displacement of the driver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
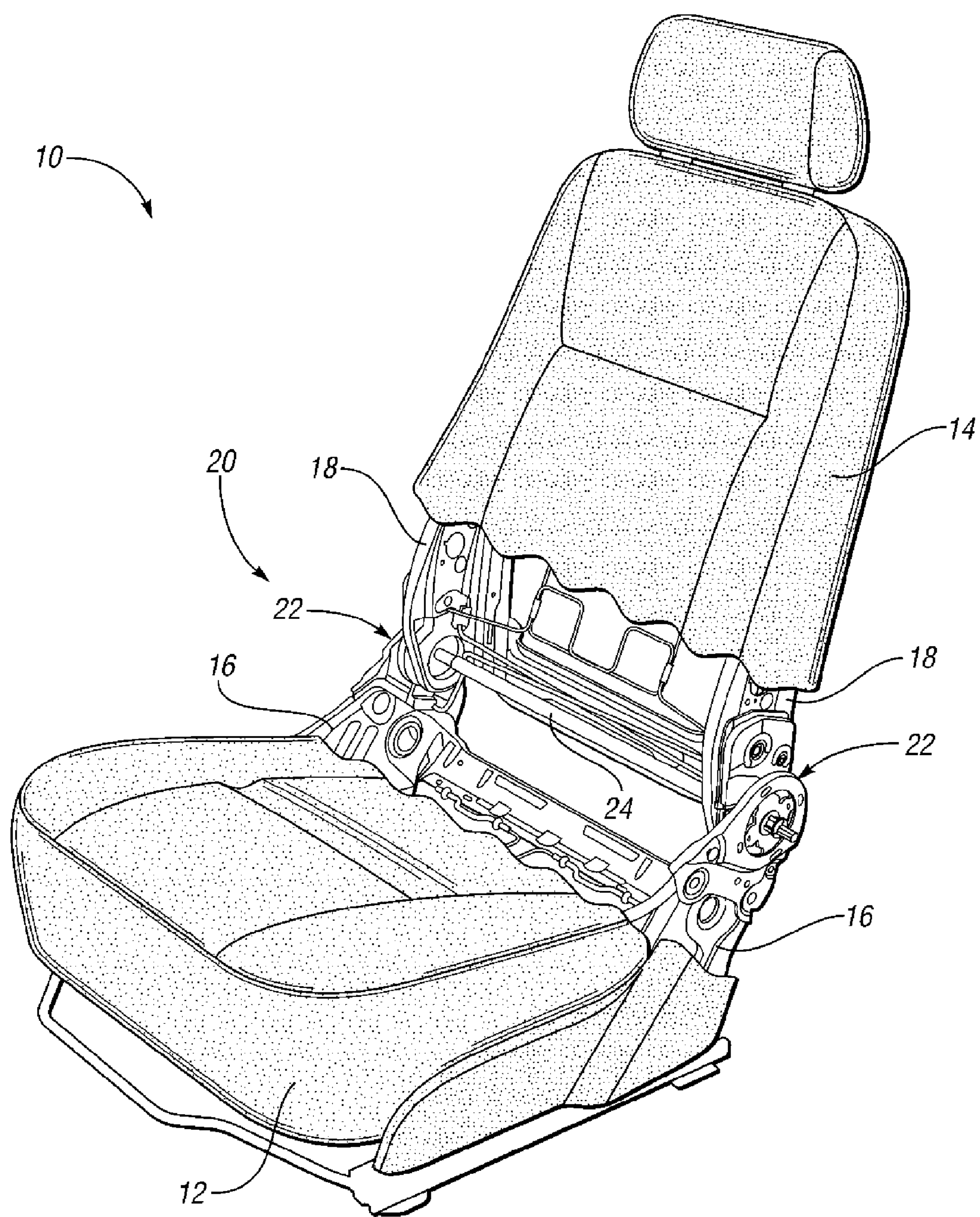
FIG. 1 is an environmental, perspective view of a vehicle seat assembly including a pair of continuous manual recliners in accordance with one or more embodiments of the present application.

Referring to FIG. 1, an exemplary seat assembly 10 is shown. The seat assembly 10 may be configured for use in a vehicle (not shown). The seat assembly 10 may include a seat bottom 12 and a seat back 14. The seat bottom 12 may be configured to be mounted on a support surface, such as a floor pan of a vehicle. At least one track assembly may be coupled to the seat bottom 12 to facilitate fore and aft positioning of the seat assembly 10. The seat back 14 may be pivotally disposed on the seat bottom 12 as will be described in more detail below.

The seat bottom 12 and seat back 14 may each include structural frames that may have any suitable configuration. In at least one embodiment, the seat bottom frame may include side members 16 disposed opposite each other and one or more cross members (not shown) that extend between the side members. Similarly, the seat back frame may include side members 18 disposed opposite each other and one or more cross members (not shown) that extend between the side members.

A recliner assembly 20 may pivotally connect the seat back 14 to the seat bottom 12. The angle of inclination (i.e., tilt) of the seat back 14 may be adjusted in response to user input. The recliner assembly 20 may include a pair of recliner mechanisms 22, one each on opposite sides of the seat assembly 10. The pair of recliner mechanisms 22 may be operatively coupled to one another via a torque rod 24. The recliner mechanisms 22 may have similar configurations. For instance, the recliner mechanisms 22 may generally be mirror images of each other. The torque rod 24 may interconnect the recliner mechanisms 22 to synchronize their operation.

Figure 2:
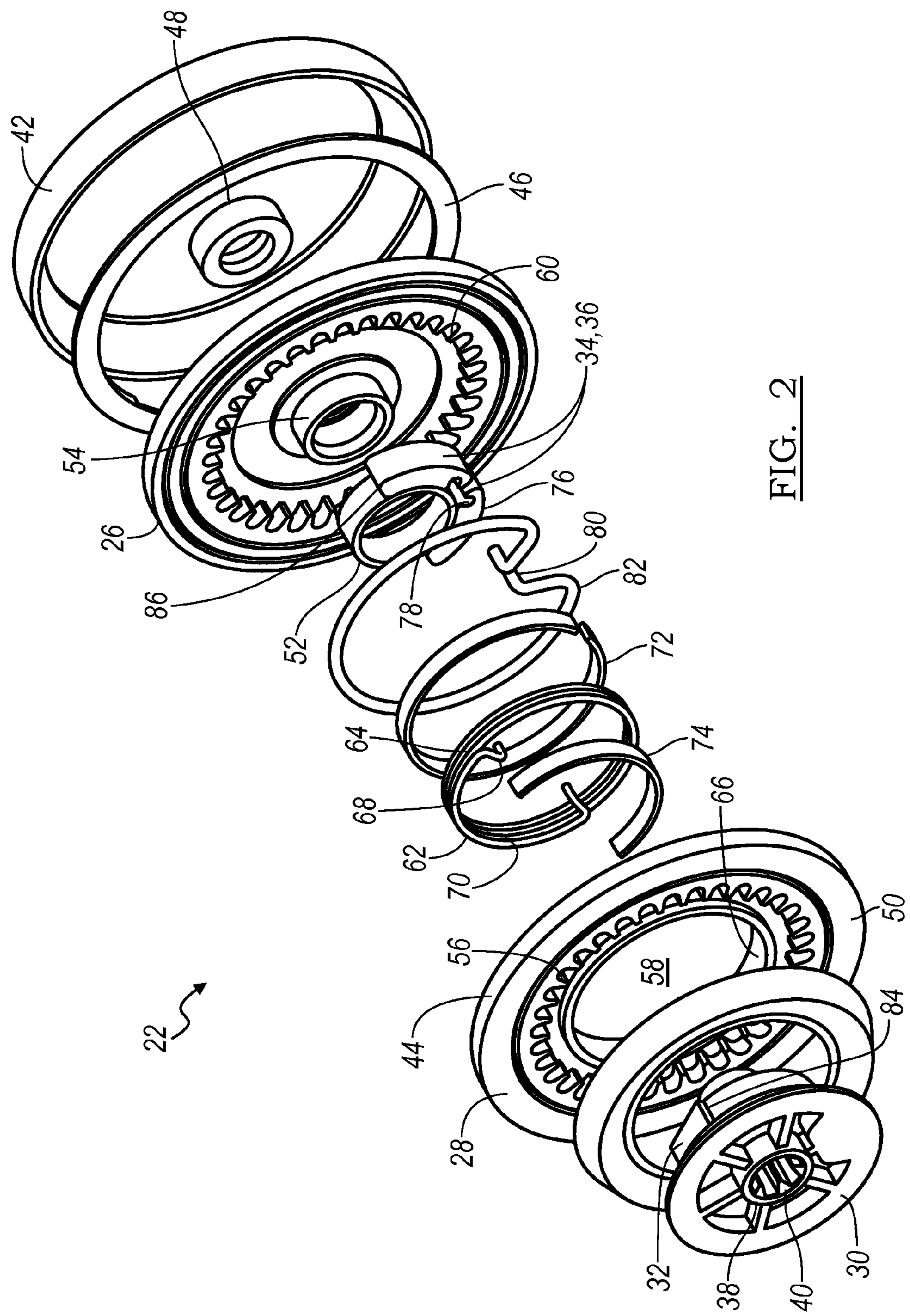
FIG. 2 is an exploded, perspective view of a continuous manual recliner, in accordance with one or more embodiments of the present application.

FIGS. 2-5 illustrate an exemplary recliner mechanism 22 that may be incorporated into the seat assembly 10 in greater detail. In particular, FIG. 2 is an exploded, perspective view of an exemplary recliner mechanism 22 including an anti-back drive device, in accordance with one or more embodiments of the present application. As will be described herein, the recliner mechanism 22 is a continuous manual recliner mechanism, such as is disclosed in U.S. Pat. No. 7,878,593, which is hereby incorporated by reference in its entirety. The recliner mechanism 22 may include an upper gear plate 26 that cooperates with a lower gear plate 28. The following description assumes that the upper gear plate 26 is attached to the moveable seat back 14 and that the lower gear plate 28 is attached to the seat bottom 12, which is fixed if not moved in relation to a seat track. The back side of the lower gear plate 28 interfaces with the front side of the upper gear plate 26.

A driver 30 may lie between the gear plates 26, 28. The driver 30 may have at least one segment 32 that influences a number (e.g., 2) of wedges 34, 36 in a manner to be described. The driver 30 may include a driveshaft receiving bore 38 that is provided with a plurality of splines 40. A driveshaft (not shown) may be received in the driveshaft receiving bore 38. The torque rod 24 may rotate the driver 30 under the influence of turning forces that are exerted by a knob (not shown), for example, positioned near or at one end of the torque rod. At the opposite end of the torque rod 24, a complimentary recliner mechanism 22 is provided on the other side of the seat assembly 10, as previously described.

A clamping ring 42 may fit over the upper and lower gear plates 26, 28 and be affixed to an outer surface 44 of the lower gear plate 28. A glider 46 may be disposed between the upper gear plate 26 and the clamping ring 42. A driver clip 48 may be received on the end of the driver 30 for holding together the various components in the assembly. A cup-shaped dust cover 50 may partially enclose the lower gear plate 28. The driver 30 may be formed of a polymer that reduces friction while minimizing noise and vibration in the recliner mechanism 22.

Figure 3:
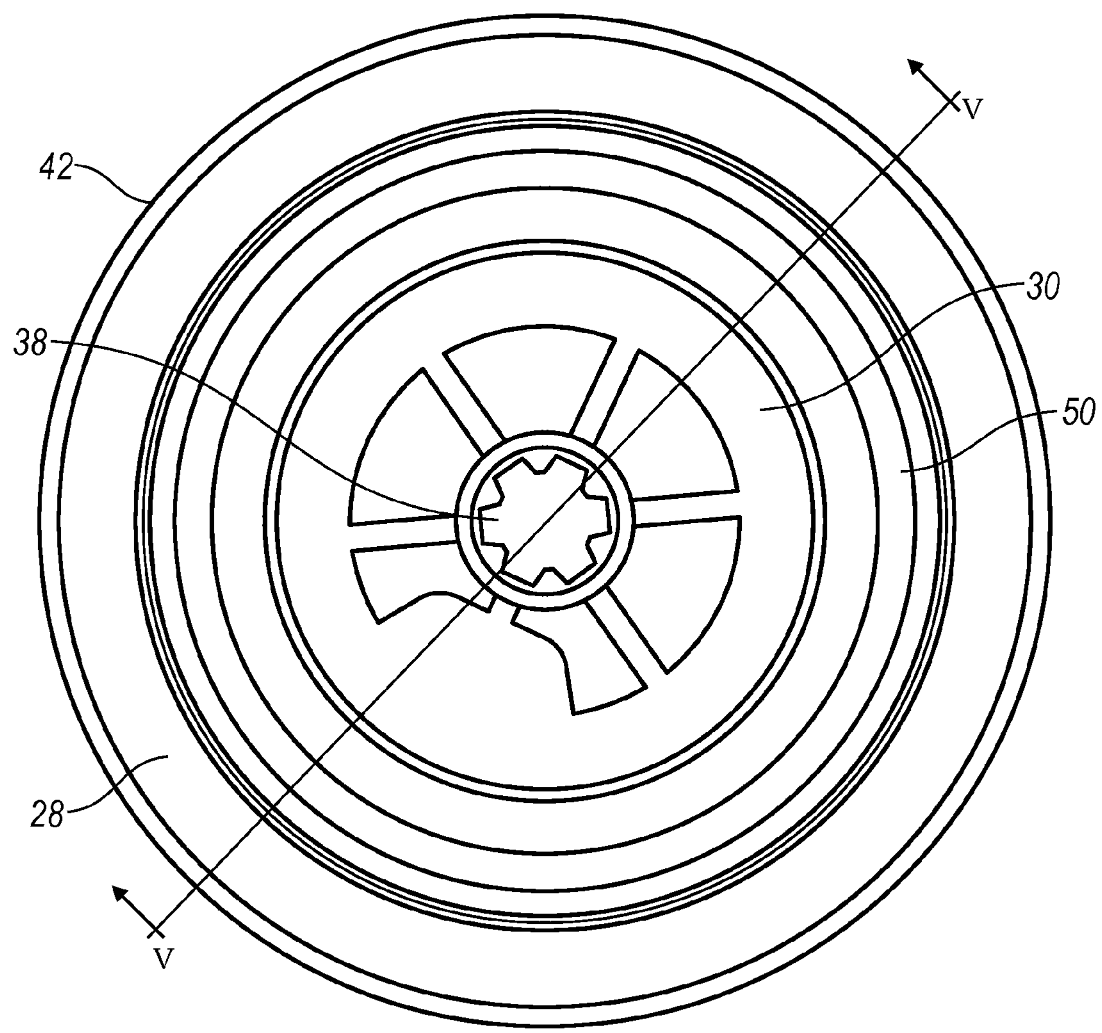
FIG. 3 is a side elevation view of the manual recliner of FIG. 2.
Figure 4:
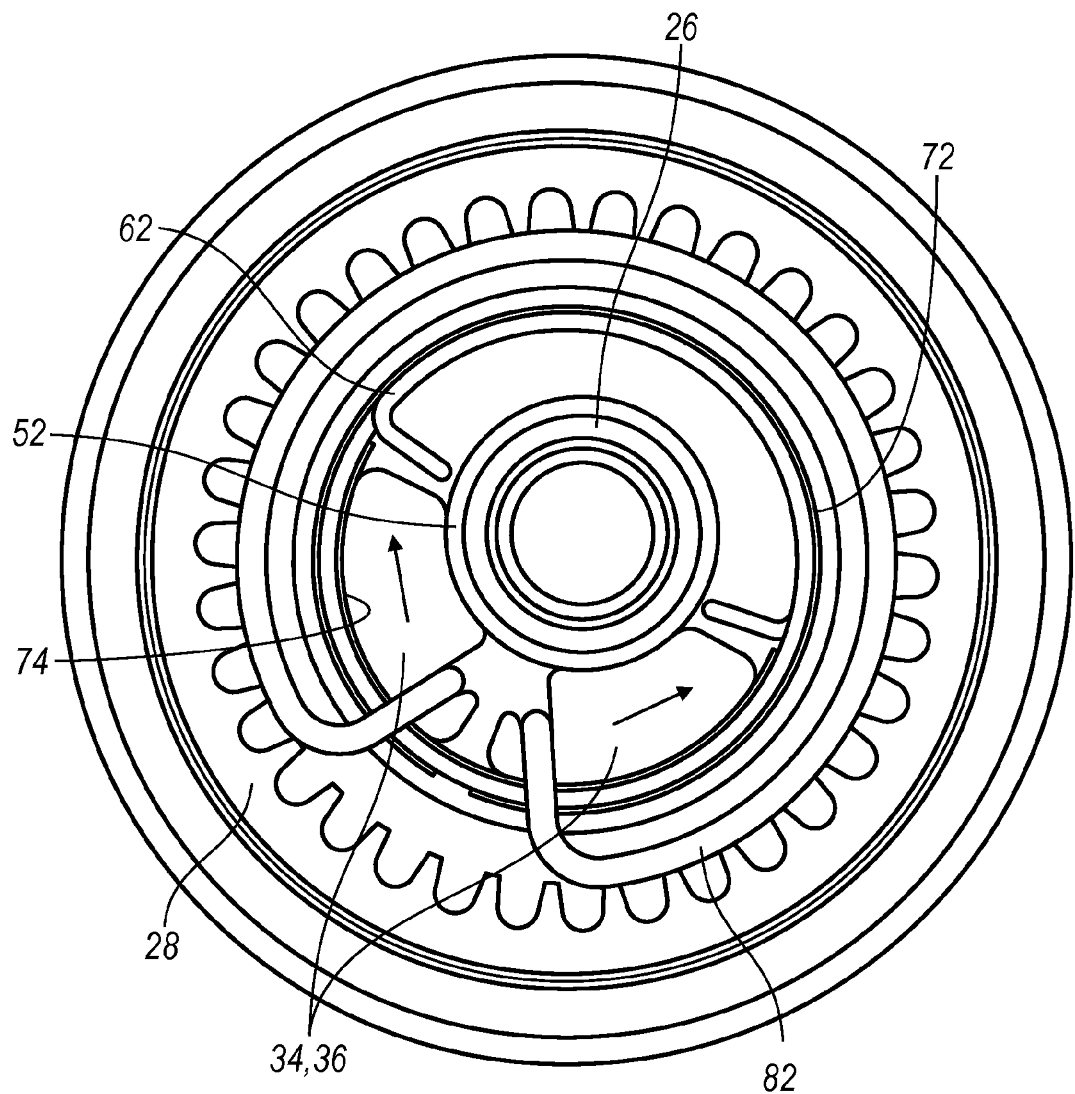
FIG. 4 is another side elevation view of the manual recliner of FIG. 2 with a dust cover and driver removed.
Figure 5:
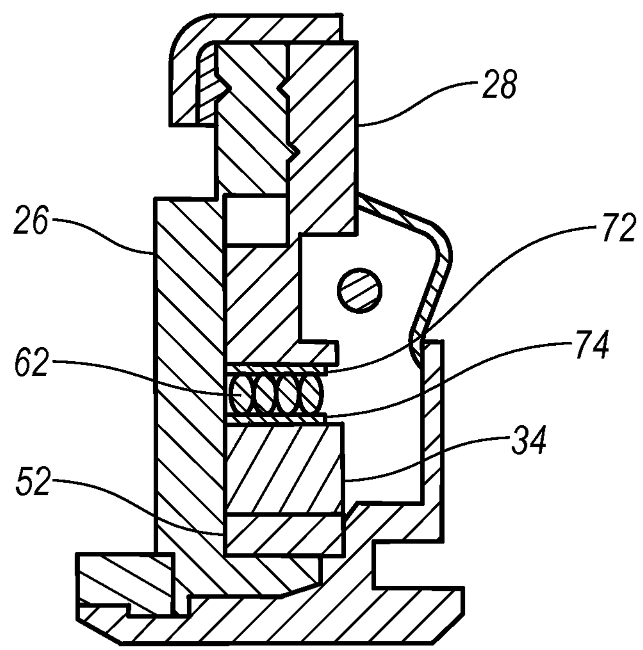
FIG. 5 is a cross sectional view taken along the sectional line V-V of FIG. 3.
Figure 5:
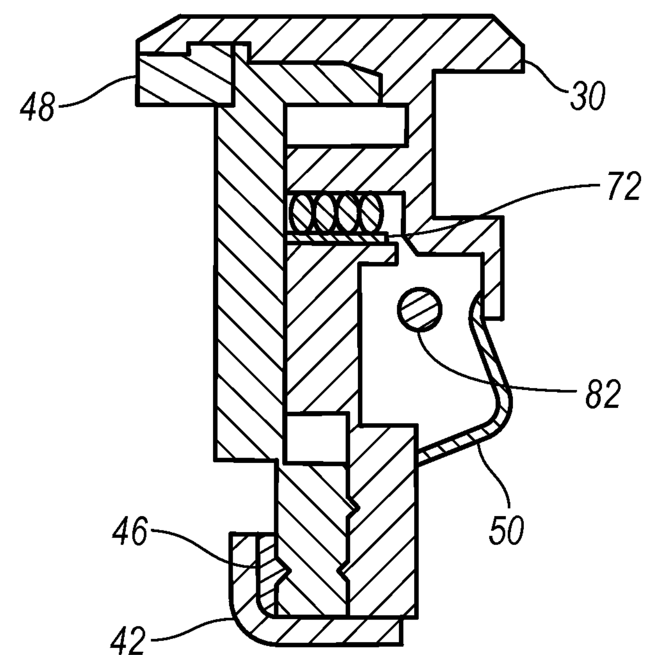

FIG. 3 is a side elevation view of the recliner mechanism 22 shown in FIG. 2. FIG. 4 is another side elevation view of the continuous manual recliner mechanism 22 shown without the driver 30 and the dust cover 50. FIG. 5 is a cross-sectional view of the recliner mechanism 22 taken along the section line V-V in FIG. 3. The fixed lower gear plate 28 is eccentrically mounted relative to the moveable upper gear plate 26. A ring 52 may support wedges 34, 36. The ring 52 may be received by a collar 54 extending from the upper gear plate 26. According to one or more embodiments, the ring 52 may be press-fitted to the collar 54 that extends from the upper gear plate 26. The ring 52 can provide a rigid, smooth bearing surface that cooperates with the wedges 34, 36. Alternatively, the collar 54 may itself support the wedges 34, 36 without the use of ring 52. Accordingly, the collar 54 may act as the ring and provide the smooth bearing surface for cooperating with the wedges 34, 36. The upper gear plate 26 may be driven by rotational forces that are manually applied to the driver 30 through a cooperative movement that is described below.

The lower gear plate 28 may include (in the depicted embodiment) a plurality of external gear plate teeth 56 and a central bore 58 in which the driver 30 is received. Internal teeth 60 may be provided on the upper gear plate 26 that engage the external teeth 56 of the lower gear plate 28. In a theoretical embodiment, the lower gear plate 28 could be provided with internal teeth and the upper gear plate 26 could be provided with external teeth.

A clutch spring 62 may be located within the central bore 58 of the lower gear plate 28 so that an outside surface 64 of the clutch spring 62 may frictionally engage a bearing surface 66 of the central bore 58 in the lower gear plate 28. The diameter of the clutch spring 62 may change in response to the rotational forces manually applied to the driver 30.

The driver 30 may engage a leg 68 of the clutch spring 62 that is mounted inside the lower gear plate 28. Depending upon the direction of driver rotation, the wedges 34, 36 exert gripping forces between the ring 52 (or collar 54) and an inside surface 70 of the clutch spring 62. In one example, clockwise arcuate movement of the driver 30 by about 34 degrees has the effect, for reasons to be stated later, of changing the inclination of the seat back 14 by about 1 degree.

A stick-slip condition of the seat back 14 (occasionally referred to as "judder") can sometimes occur when a continuous manual recliner is rotated under load. According to one or more embodiments, a first split bushing 72 may be disposed between the bearing surface 58 in the lower gear plate 28 and the clutch spring 62 to eliminate this stick-slip condition. Accordingly, the outside surface 64 of the clutch spring 62 may frictionally engage the first split bushing 72, which, in turn, may frictionally engage the bearing surface 66 of the lower gear plate 28. According to one or more embodiments of the present application, the first split bushing 72 may be annular having a relatively small opening such that the first split bushing 72 substantially encircles the clutch spring 62.

Moreover, a second split bushing 74 may be disposed between the clutch spring 62 and wedges 34, 36 to eliminate effort spikes caused by the gear tight mesh variation. According to one or more embodiments, the second split bushing 74 may be a split "leaf" bushing. To this end, the second split bushing 74 may be relatively semi-circular and positioned radially adjacent to the wedges 34, 36. The circumferential length of the second split bushing 74 may be sufficient to substantially surround the wedges 34, 36 and/or maintain continuous contact with the wedges 34, 36 and the clutch spring 62. In addition to helping eliminate the stick-slip condition of a seat back frame, the first and second split bushings 72, 74 may also help to lower the operating effort of the knob.

It will be appreciated that in practice, in one embodiment, it may be desirable to engineer a delay between the cause and effect of driver rotation. For example, if the driver 30 is rotated by a few degrees initially, that movement may not be transmitted instantaneously to the clutch spring 62. Neither is that movement instantaneously transmitted from the clutch spring 62 to the wedges 34, 36. One way to achieve the delay is by engineering a gap or space between otherwise cooperating components.

To this end, a pair of driving legs 68 that are provided on the clutch spring 62 may engage the wedges 34, 36 (FIG. 4). A bearing engaging surface 76 (FIG. 2) of the wedges 34, 36 may engage the second split bushing 74 disposed at the inside surface 70 of the clutch spring 62 and, thus, the bearing surface 66 of the lower gear plate 28. The wedges 34, 36 may also include notches 78 that receive first and second axially extending driving legs 80 of a wedge spring 82. Thus, the wedge spring 82 may bias the wedges 34, 36 so that the ring 52 and the upper gear plate 26, through the collar 54, are secured.

In one embodiment, to adjust the seat back angle, the driver 30 may be rotated in a desired direction, e.g., clockwise. This pushes a leg 68 of the clutch spring 62 which in turn pushes an associated wedge 34 or 36. This unlocks the recliner (FIG. 4) and allows the upper gear plate 26 to rotate around the lower gear plate 28. This movement is enabled by the respective gear plate teeth 56 and 60 rolling in relation to each other. Conversely, to prevent undesired tilting when forces are applied to the seat back 14—which is attached to the upper gear plate 26—the upper gear plate 26 rotates wedge 34 or wedge 36 pushing a driving leg 68 of the clutch spring 62. Thus, the clutch spring 62 may expand and lock in relation to the central bore 58 of the lower gear plate 28.

In assembling the disclosed mechanism, the ring 52, if present, may be mounted on the collar 54 of the upper gear plate 26. Then the lower gear plate 28 may be mounted within the inside of the upper gear plate 26. Next, the glider 46 may be inserted on the inside of the clamping ring 42. Then, the upper-lower gear plate subassembly may be pressed into the inside of the clamping ring 42. Next, the clutch spring 62 and the first and second split bushings 72, 74 may be mounted to the inside of the bearing surface 66 that is defined within the lower gear plate 28. Then, the wedges 34, 36 may be assembled on the outside of the ring 52 or collar 54 and placed within the clutch spring 62 to the inside of the second split bushing 74. The next step is to insert driving legs 80 that extend from the wedge spring 82 into notches 78 that are defined within the wedges 34, 36. Then, the dust cover 50 may be applied to the outer surface of the lower gear plate 28. Finally, the driver 30 may be inserted within the dust cover 50. The end of the driver 30 can then be received within the upper gear plate 26, and is secured in that position by the driver clip 48 that is placed on the outside of the upper gear plate 26. It will be appreciated that in practice, there are a number of alternative ways for assembling the components of the assembly together. Once assembled, there may also be a number of approaches for securing the clamping ring 42 and the lower gear plate 28 together. By way of non-limiting examples, TIG welding, MIG welding, or laser welding are illustrative approaches.

In operation, the occupant of the seat may, for example, desire to change the inclination of the seatback from 19 degrees to 20 degrees in relation to a vertical plane. To accomplish this objective, the vehicle seat occupant may manually rotate a knob (not shown) that is affixed to the torque rod 24 that is in turn engaged by the splines 40 that extend from the axial bore 38 within the driver 30. In an illustrative, non-limiting embodiment, consider the effect of the vehicle occupant rotating the knob by about 34 degrees. After that angular displacement, the torque rod 24 rotates the driver 30 (optionally, following a short delay) by about 34 degrees, for example. The driver 30 may include a flange 84 which engages the leg 68 of clutch spring 62 and in turn a surface 86 of a wedge 34, 36. The effect of this rotation for example in a clockwise direction when viewed from the perspective of FIG. 2 is to unlock or disengage the assembly, thereby allowing intermeshing teeth to roll in relation to each other.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism for releasably securing a seat back with respect to a seat cushion comprising:

- an upper gear plate adapted to be affixed to the seat back, the upper gear plate defining gear teeth;
- a lower gear plate secured to a seat bottom, the lower gear plate defining gear teeth that cooperate with the gear teeth of the upper gear plate;
- at least one wedge that is mounted in relation to the upper gear plate;
- a ring disposed radially inward from the at least one wedge and providing a support surface for the at least one wedge;
- a clutch spring that is located within a central bore of the lower gear plate, the clutch spring having two driving legs projecting radially inwardly and axially, by which the at least one wedge is engaged;
- a first bushing disposed within the central bore between the lower gear plate and the clutch spring so that an outside surface of the clutch spring can frictionally engage the first bushing;
- a second bushing disposed between the at least one wedge and the clutch spring;
- a wedge spring having support legs projecting generally perpendicularly therefrom, the support legs engaging the at least one wedge and biasing the at least one wedge so that the at least one wedge may engage an inner surface of the second bushing; and
- a driver extending through the lower gear plate, the first bushing, the clutch spring, the wedge spring, the second bushing, and the upper gear plate, the driver engaging at least one driving leg of the clutch spring so that, depending on a direction of driver rotation, the at least one wedge exerts gripping forces between the ring and the inside of the second bushing.

2. The recliner mechanism according to claim 1, wherein the gear teeth of the lower gear plate include external teeth and the gear teeth of the upper gear plate include internal teeth that engage the external teeth of the lower gear plate so that when the mechanism is unlocked, the upper gear plate can rotate around the lower gear plate by respective internal and external teeth rolling in relation to each other.

3. The recliner mechanism according to claim 1, wherein one or more of the at least one wedge have notches that receive the support legs of the wedge spring, the support legs biasing the at least one wedge at a broad side face thereof.

4. The recliner mechanism according to claim 1, wherein the gear teeth of the lower gear plate include internal teeth and the gear teeth of the upper gear plate include external teeth that engage the internal teeth of the lower gear plate so that when the mechanism is unlocked, the upper gear plate can rotate around the lower gear plate by respective internal and external teeth rolling in relation to each other.

5. The recliner mechanism according to claim 1, wherein the lower gear plate has a back side and the upper gear plate has a front side, the back side of the lower gear plate interfacing with the front side of the upper gear plate.

6. The recliner mechanism according to claim 1, wherein rotational forces are manually applied to the driver so that a diameter of the clutch spring changes in response.

7. The recliner mechanism according to claim 1, wherein the lower gear plate is fixed in relation to the seat bottom, the lower gear plate being eccentrically mounted relative to the upper gear plate, which moves with arcuate displacement of the seat back.

8. The recliner mechanism according to claim 1, wherein the ring supporting the at least one wedge is received by a collar that extends from the upper gear plate so that the ring is fixedly attached to the collar, the ring providing a rigid, smooth bearing surface that cooperates with the at least one wedge.

9. The recliner mechanism according to claim 1, wherein the ring supporting the at least one wedge is formed by a collar that extends from the upper gear plate, the collar providing a rigid, smooth bearing surface that cooperates with the at least one wedge.

10. The recliner mechanism according to claim 1, wherein to prevent undesired tilting when forces are applied to the seat back that is attachable to the upper gear plate, the at least one wedge rotates with the upper gear plate pushing at least one of the driving legs of the clutch spring so that the clutch spring expands and locks in relation to the central bore of the lower gear plate.

11. The recliner mechanism according to claim 1, wherein there is a delay between driver rotation and displacement of the clutch spring and the at least one wedge.

12. A recliner mechanism for releasably securing a seat back with respect to a seat cushion comprising:

- an upper gear plate adapted to be affixed to the seat back, the upper gear plate defining gear teeth;
- a lower gear plate secured to a seat bottom, the lower gear plate defining gear teeth that cooperate with the gear teeth of the upper gear plate;

at least one wedge that is mounted in relation to the upper gear plate;

a clutch spring that is located within a central bore of the lower gear plate;

a split bushing disposed within the central bore between the lower gear plate and the clutch spring so that an outside surface of the clutch spring can frictionally engage the split bushing;

a wedge spring that engages the at least one wedge and biases the at least one wedge so that the at least one wedge may engage an inner surface of the clutch spring; and a driver extending through the lower gear plate, the split bushing, the clutch spring, the wedge spring, and the upper gear plate.

13. The recliner mechanism according to claim 12, wherein the wedge spring has support legs projecting generally perpendicularly therefrom, the support legs biasing the at least one wedge so that it engages the inner surface of the clutch spring.

14. The recliner mechanism according to claim 12, wherein rotational forces are manually applied to the driver so that a diameter of the clutch spring changes in response.

15. The recliner mechanism according to claim 12, wherein the lower gear plate is fixed in relation to the seat bottom, the lower gear plate being eccentrically mounted relative to the upper gear plate such that the upper gear plate rotates around the lower gear plate by respective gear teeth rolling in relation to each other, the upper gear plate moving with arcuate displacement of the seat back.

16. The recliner mechanism according to claim 12, further comprising a ring disposed radially inward from the at least one wedge and providing a support surface for the at least one wedge.

17. The recliner mechanism according to claim 16, wherein the ring supporting the at least one wedge is formed by a collar that extends from the upper gear plate, the collar providing a rigid, smooth bearing surface that cooperates with the at least one wedge.

18. The recliner mechanism according to claim 16, wherein the clutch spring has two driving legs projecting radially inwardly and axially, by which the at least one wedge is engaged, the driver engaging at least one driving leg of the clutch spring so that, depending on a direction of driver rotation, the at least one wedge exerts gripping forces between the ring and the inner surface of the clutch spring.

19. The recliner mechanism according to claim 18, further comprising a split leaf bushing disposed between the at least one wedge and the clutch spring, wherein the gripping forces exerted by the at least one wedge to the inner surface of the clutch spring are transferred by the split leaf bushing.

* * * * *